United States Patent Office 2,736,662
Patented Feb. 28, 1956

2,736,662

LIQUID FOR RECLAIMING RUBBER

Edward A. Van Valkenburgh, Greene, N. Y.

No Drawing. Application August 14, 1951,
Serial No. 241,889

5 Claims. (Cl. 106—123)

This invention relates to compositions for use in the reclaiming of rubber, and particularly synthetic rubber, by the acid reclaiming process.

The new compositions of the present invention are homogeneous liquid compositions made by blending heat treated crude tall oil with a relatively large amount of non-volatile hydrocarbon oil and advantageously with a small amount of petroleum naphtha.

In the acid reclaiming of vulcanized rubber such as tire treads, the rubber is subjected to prolonged acid digestion with the addition of a small amount of zinc chloride or calcium chloride. The new compositions of the present invention are particularly advantageous for use in such acid reclaiming processes.

The new compositions are made up mainly of liquid hydrocarbon oils which are non-volatile at ordinary vulcanization temperatures or which contain only a limited amount of constituents volatile at such temperatures. With such hydrocarbon oils, there is uniformly blended, to form a homogeneous mixture, a relatively smaller amount of heat treated crude tall oil.

Crude tall oil is produced as a byproduct from the paper pulp industry and is made up largely of resin acids and fatty acids, e. g., around 50% of resin acids, 40% of fatty acids, and around 10% of unsaponifiable material such as sterols and high molecular weight aliphatic alcohols. Such crude products form a semi-solid non-homogeneous mass on standing and may separate into an upper liquid and lower solid or semi-solid layer. Such crude products are not well adapted for use in rubber reclaiming.

In using the crude tall oil in making the new reclaiming compositions, it is subjected to a heat treatment for a sufficient period of time to form a homogeneous liquid product, e. g., by heating to a temperature of around 350° F. for about one hour. The temperature and time can be varied, e. g., between 260° and 400° F. and between one and one-half hours and half an hour, but should be continued to ensure homogeneity for the heat treated crude tall oil.

To the hot heat treated crude tall oil, there is added, with continuous stirring and agitation, an amount of liquid hydrocarbon oil which is considerably greater than the amount of tall oil and advantageously at least two or three times as much, so that the hydrocarbon oil is the main constituent of the composition.

The hydrocarbon oil should be largely, if not entirely, a hydrocarbon oil which is non-volatile at the ordinary vulcanization temperatures.

The proportions of tall oil and hydrocarbon oil can be somewhat varied so that e. g. between 5% and 40% of heat treated tall oil is used with 60% to 95% hydrocarbon oil. More advantageous proportions are 10% to 30% of heat treated tall oil and 70% to 90% of hydrocarbon oil.

The hydrocarbon oils used are largely liquid hydrocarbon oils which are non-volatile at vulcanization temperatures. One advantageous type of hydrocarbon oil is the naphthenic oil sold under the trade name "Lopor 42," having a specific gravity of around .908 at 60° F., a weight of about 7.56 pounds per gallon at 60° F., a flash point of about 360° F., a viscosity at 100° F. of about 154, and at 210° F. of about 42, a pour point of about −20° F., and an aniline point of about 170° F.

Another advantageous non-volatile petroleum oil is the aromatic petroleum oil sold under the trade name "WS–945," which is extracted from naphthene base cylinder stock lubricating oils with phenol, which has a specific gravity at 60° F. of about .982, a weight at 60° F. of about 8.18 pounds per gallon, a flash point of about 425° F., a viscosity at 100° F. of 9800 and at 210° F. of 125, a pour point of above 40, and an aniline point of about 108.

With such non-volatile hydrocarbon oils, there is also advantageously used a relatively small amount of naphtha, which acts as a homogenizing agent and improves the penetrating properties of the composition. A naphtha such as sold in the trade as "Esso Aromatic Naphtha 180" has a typical API gravity of about 21.8, weighs about 7.69 pounds per gallon, has a flash point of about 196° F., a pour point below 0° F., an initial boiling point (ASTM distillation) of about 404 with a 10% boiling at about 480, 50% at about 508, 90% at about 548, and a final boiling point of about 584, and containing about 65% aromatics and with a mixed aniline point of about 41.6° C.

Such an aromatic naphtha is more volatile than the non-volatile oils above referred to, but is advantageously used in small amount with the non-volatile oils as a homogenizer and to give improved penetrating properties.

An advantageous composition is made by blending 30 parts by weight of heat treated crude tall oil, 60 parts by weight of non-volatile petroleum oil such as the oils above referred to as "Lopor 42" and "WS–495," and 10 parts of a more volatile naphtha such as the oil above referred to as "180 Naphtha."

One advantageous method of making such a composition is to heat treat the crude tall oil by heating it with agitation to a temperature of around 350° F. for one hour to ensure homogeneity, and then gradually add to the hot heat treated tall oil a non-volatile hydrocarbon oil, with continued stirring. The non-volatile oil added at ordinary temperature cools the hot heat treated crude tall oil. Before adding the "180 Naphtha," the blended tall oil and non-volatile hydrocarbon oil are advantageously heated to a temperature of around 250° F. and the naphtha then gradually added at a point below the surface of the mixture and with continued agitation. Some volatilization of low boiling fractions of the naphtha may occur during this blending. The result of this procedure is to give a homogeneous fluid composition, well adapted for use for rubber reclaiming.

Another example of the composition is made in a similar way, using 25 parts by weight of heat treated crude tall oil, 50 parts by weight of non-volatile hydrocarbon oil such as "WS–945" or "Lopor 42," and 25 parts of naphtha such as "180 Naphtha."

Another example illustrating the composition is the use of 10 parts by weight of crude heat treated tall oil, 65 parts of non-volatile hydrocarbon oil such as "WS–945" or "Lopor 42" and 25 parts of naphtha such as "180 Naphtha."

While the more volatile naphtha can, in some cases, be omitted, where the non-volatile oil forms a homogeneous liquid composition, as where 20 or 30 parts of heat treated crude tall oil are used with 80 or 70 parts of non-volatile hydrocarbon oil such as "Lopor 42," the use of a small amount naphtha is advantageous as a homogenizing agent and to give improved penetration in the resulting composition. The naphthas used are advantageously those produced by the so-called "hydroforming process," in which dehydrogenation occurs and a large amount of aromatic hydrocarbons are formed.

In using the new compositions for rubber reclaiming in the acid reclaiming process, the oil composition is added, e. g., to the extent of about 125 gallons or 1,000 pounds to a 10,000 pound batch of whole tire scrap, and the digestion is carried out with e. g. around 1% of calcium chloride for a sufficient period of time to effect reclaiming from the rubber. The composition acts as a softening and penetrating material, and the presence of a substantial amount of acid supplied by the tall oil increases penetrating properties and has a special action in the compound. The composition is particularly advantageous for use in the reclaiming of vulcanized GR-S synthetic rubber scrap. The hydrocarbon oil will largely remain in the reclaimed rubber, and the tall oil acids or their neutralization products will also be present in the reclaimed rubber. With the synthetic rubber scrap, the new composition, due to its tall oil content and aromatic oil content, is particularly effective in softening the hard synthetic rubber scrap without making it undesirably tacky.

The new composition can be used in the acid reclaiming process for reclaiming natural rubber scrap or mixtures of natural and synthetic rubber scrap such as tire tread stock, and particularly synthetic rubber scrap such as GR-S tire treads, etc.

I claim:

1. A homogeneous liquid for use in reclaiming rubber by the acid process, said composition consisting essentially of heat treated crude tall oil preheated to a temperature in excess of about 260° F. and blended with a much larger proportion of petroleum hydrocarbon oil, largely non-volatile at the temperature of vulcanization, the proportions of heat treated crude tall oil and hydrocarbon oil being from about 5% to 40% of the heat treated crude tall oil and 60% to 95% of liquid hydrocarbon oil.

2. A homogeneous liquid for use in reclaiming rubber by the acid process, said composition consisting essentially of heat treated crude tall oil preheated to a temperature in excess of about 260° F. and blended with a much larger proportion of petroleum hydrocarbon oil, largely non-volatile at the temperature of vulcanization, the proportions of heat treated crude tall oil and hydrocarbon oil being from about 10% to 30% of the heat treated crude tall oil and 70% to 90% of liquid hydrocarbon oil.

3. A composition as defined in claim 1, in which the hydrocarbon oil is a blend made up mainly of non-volatile oil and a smaller proportion of aromatic petroleum naphtha.

4. A composition as defined in claim 2, in which the hydrocarbon oil is a blend made up mainly of non-volatile oil and a smaller proportion of aromatic petroleum naphtha.

5. A homogeneous liquid for use in reclaiming rubber by the acid process, said composition consisting essentially of heat treated crude tall oil preheated to a temperature in excess of about 260° F. and blended with a much larger proportion of petroleum hydrocarbon oil, the petroleum hydrocarbon oil being a blend of hydrocarbon oil non-volatile at the vulcanization temperature and of aromatic petroleum naphtha, the proportions of the oils being from 5% to 40% heat treated crude tall oil, from 35% to 85% of non-volatile hydrocarbon oil, and 10% to 25% of aromatic petroleum naphtha.

References Cited in the file of this patent

UNITED STATES PATENTS

| | | |
|---|---|---|
| 649,080 | Sherrin | May 8, 1900 |
| 1,897,686 | Wilson | Feb. 14, 1933 |
| 2,275,186 | Seggesseman | Mar. 3, 1942 |
| 2,316,499 | Borglin | Apr. 13, 1943 |
| 2,387,827 | Borglin | Oct. 30, 1945 |
| 2,555,257 | Van Valkenburgh | May 29, 1951 |